V. PONS.
CONSTRUCTION OF SPARK PLUGS.
APPLICATION FILED MAR. 31, 1916.
1,315,792.
Patented Sept. 9, 1919.
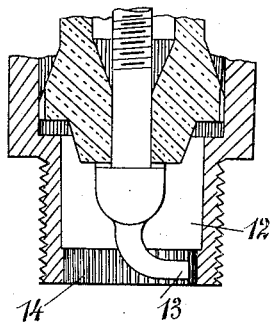
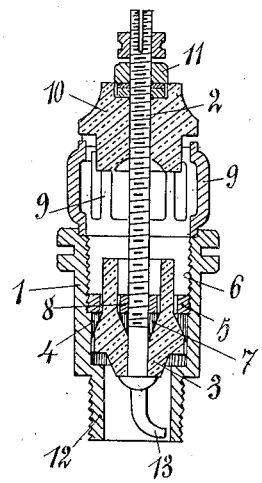
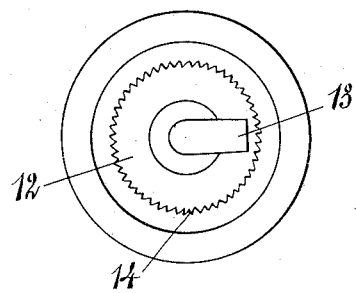
Inventor
Victor Pons,
by Rosenbaum, Stockbridge & Rorst.
Attys.

UNITED STATES PATENT OFFICE.

VICTOR PONS, OF LYON, FRANCE.

CONSTRUCTION OF SPARK-PLUGS.

1,315,792.  Specification of Letters Patent.  Patented Sept. 9, 1919.

Application filed March 31, 1916. Serial No. 87,886.

*To all whom it may concern:*

Be it known that I, VICTOR PONS, citizen of the French Republic, residing at Lyon, in the Department of the Rhone, France, have invented certain new and useful Improvements in the Construction of Sparking-Plugs, of which the following is a specification.

This invention consists in improvements in the construction of sparking plugs.

These improvements are described hereinafter and are illustrated in the drawings annexed to this specification. In these drawings:—

Figure 1 is a vertical diametral section; Fig. 2 is a partial diametral section; and Fig. 3 is an end view.

An improved sparking plug in accordance with this invention, comprises, as usual, the plug body or metal base piece 1 constituting the body electrode, and the central rod 2 constituting the insulated electrode.

The insulation and mounting of the rod 2 are effected by means of the insulating member 3 the centering of which in the base piece 1 and its tight-jointing are assured by means of a conical packing 4 pressed between the base piece 1 and the insulating member 3. In order to assure a perfect contact and tightness of the joint, the pressure exerted upon the conical packing 4 is produced with gradually increasing force by means of a nut 5 adapted to be screwed by means of a pin-spanner or other device in a screw-thread 6 formed on the inside of the upper part of the base piece 1.

The centering and tight-jointing of the rod 2 extending through the insulating member 3 are effected by means similar to those adopted for centering and tight-jointing the said member 3 inside the base piece 1, that is to say, likewise by means of a conical joint 7 and a nut 8 screwing on the central rod 2, the tightening effect of this internal joint acting in the opposite direction to that of the external joint 4.

Moreover, the insulating member 3 does not extend beyond the upper end of the base piece 1, so that the middle portion of the central rod 2 is left free for the purpose of allowing it to be partially cooled by the outside air. This is effected by means of a kind of circular metal grating composed of bars having large cooling surfaces, upon which there is mounted an insulating member 10 that surrounds the upper end of the central rod 2 and is designed to support the wire connection 11.

Owing to its situation above the heat-dispersing grating 9, the insulating member 10 heats very slightly or not at all, and therefore it may be made of any suitable unbreakable insulating substance, such as for instance, fiber, ebonite and others.

The assemblage of the grating 9 and the insulating member 10 on the base piece 10 is assured by one of the parts of the wire connection 11 which acts as a clamping nut screwing upon the rod 2.

The inner cylindrical wall of the base piece 1 (which constitutes the combustion chamber 12 in which there is situated the end 13 of the central rod 2 that constitutes the insulated sparking electrode) instead of being smooth, is furrowed, by grooves 14, preferably in the shape of saw teeth as shown in Fig. 3. These grooves are preferably vertical and may extend over a part or the whole of the height of the inner cylindrical surface of the base-piece 1 that constitutes the chamber 12.

The advantages that result from an improved sparking plug constituted according to this invention as hereinbefore described, are as follows:

1. Absolute tightness of the joints due to progressive and adjustable pressure by means of nuts, which also allows of an easy assembling and dis-assembling of all the parts that form the sparking plug.

2. Centering of the insulated electrode by means of an external conical joint having the reverse jamming action to that of the internal conical joint.

3. Cooling of the middle portion of the central rod of the insulated electrode, thus avoiding self-ignition. This arrangement also allows of reducing the size of the insulating member inside the base piece, and of employing an unbreakable insulating material for supporting the wire connection.

4. Successive cooling by the air flowing through the grating, as well as by contact with upper portion of the base piece and the internal surfaces of the insulating members.

5. A hotter spark is produced by the serrated surface of the wall of the combustion chamber facing the insulated electrode.

6. It is impossible for the body electrode to become insulated, because no oil can remain or get dried by the heat on the sharp edges of the serrations.

It is to be understood that the details may be modified to suit the type of the sparking plugs to which the improvements of this invention shall be applied.

Having now described and ascertained the nature of my invention, I declare that what I claim is:

1. A spark plug comprising in combination; a plug body provided with an inner shoulder, an insulating member resting upon the said shoulder on the plug body, an inner electrode extending through the insulating member having a bearing against the bottom face thereof, the insulating member having a cylindrical wall spaced from the inner wall of the plug body and from the inner electrode, the inner surface of said cylindrical wall terminating in a conical surface extending toward the inner electrode, and the outer surface of the cylindrical wall terminating in a conical surface extending toward the inner surface of the plug body, packing means in the spaces between the insulating member and the plug body and between the insulating member and the inner electrode, nuts screwed in the plug body and upon the inner electrode, respectively, and adapted to tightly press said packing means in position and hold the insulating member against the shoulder on the plug body, an open-work member resting upon the plug body, an insulating plug resting upon said open work member, said plug leaving a free space between its inner end and the first mentioned insulating member and a nut screwed upon the inner electrode and adapted to hold the insulating plug and open-work member in position, substantially as described.

2. In a spark plug, a center rod electrode having a laterally extending end and a sleeve electrode surrounding the lower end of said electrode, said sleeve having vertically disposed sharp and thin serrations formed over a comparatively extended vertical portion of the inner cylindrical wall of the sleeve electrode, substantially as described.

In testimony whereof I affix my signature in presence of two witnesses.

VICTOR PONS.

Witnesses:
 CARLTON HURST,
 MARIN VACHON.